(12) United States Patent
Yokota et al.

(10) Patent No.: US 7,874,579 B2
(45) Date of Patent: Jan. 25, 2011

(54) CURTAIN AIRBAG BRACKET AND CURTAIN AIRBAG DEVICE

(75) Inventors: Masatoshi Yokota, Tokyo (JP); Seiji Watanabe, Tokyo (JP); Takeki Minamikawa, Tokyo (JP)

(73) Assignee: Takata Corporation, Tokyo (JP)

( * ) Notice: Subject to any disclaimer, the term of this patent is extended or adjusted under 35 U.S.C. 154(b) by 80 days.

(21) Appl. No.: 12/382,203

(22) Filed: Mar. 11, 2009

(65) Prior Publication Data

US 2009/0302581 A1 Dec. 10, 2009

(30) Foreign Application Priority Data

Jun. 9, 2008 (JP) .............................. 2008-150874

(51) Int. Cl.
*B60R 21/20* (2006.01)
*B60R 21/213* (2006.01)
(52) U.S. Cl. ................................. 280/730.2; 280/728.2
(58) Field of Classification Search .................. 24/197, 24/200; 248/300, 309.1; 280/728.2, 730.2
See application file for complete search history.

(56) References Cited

U.S. PATENT DOCUMENTS

| | | | | |
|---|---|---|---|---|
| 5,265,903 A | * | 11/1993 | Kuretake et al. | 280/730.2 |
| 5,899,486 A | * | 5/1999 | Ibe | 280/728.2 |
| 6,254,123 B1 | * | 7/2001 | Urushi et al. | 280/730.2 |
| 6,293,581 B1 | * | 9/2001 | Saita et al. | 280/730.2 |
| 6,585,287 B1 | * | 7/2003 | Spaulding et al. | 280/728.2 |
| 6,626,457 B2 | * | 9/2003 | Masuda et al. | 280/728.2 |
| 6,942,241 B2 | * | 9/2005 | Yamamura et al. | 280/728.2 |
| 7,156,413 B2 | * | 1/2007 | Fischer et al. | 280/728.2 |
| 7,159,896 B2 | * | 1/2007 | Ochiai et al. | 280/730.2 |
| 7,328,911 B2 | * | 2/2008 | Chapman | 280/728.2 |
| 7,607,684 B2 | * | 10/2009 | Downey et al. | 280/730.2 |
| 7,631,889 B2 | * | 12/2009 | Watanabe | 280/728.2 |
| 2004/0012172 A1 | * | 1/2004 | Deligny et al. | 280/728.2 |
| 2005/0173902 A1 | * | 8/2005 | Boxey | 280/730.2 |
| 2006/0197316 A1 | | 9/2006 | Watanabe | |
| 2007/0241543 A1 | * | 10/2007 | Jang et al. | 280/730.2 |
| 2008/0284142 A1 | * | 11/2008 | Cheal et al. | 280/730.2 |

FOREIGN PATENT DOCUMENTS

| | | |
|---|---|---|
| DE | 10 2005 051 728 A1 | 5/2007 |
| EP | 1 484 222 A1 | 12/2004 |
| EP | 1 764 271 A2 | 3/2007 |
| JP | H11-129857 | 5/1999 |

(Continued)

OTHER PUBLICATIONS

Norimasa Goto, Air Bag Device, May 21, 2005, JPO, JP 2005-104234 A, Machine Translation of Description.*

*Primary Examiner*—Paul N Dickson
*Assistant Examiner*—James English
(74) *Attorney, Agent, or Firm*—Manabu Kanesaka

(57) ABSTRACT

A curtain airbag bracket mounts a curtain airbag having an attachment piece provided in an edge portion of the curtain airbag to a vehicle body. The curtain airbag bracket includes a vehicle body attaching portion for attaching the curtain airbag bracket to the vehicle body, and an airbag mounting portion for mounting the attachment piece. The airbag mounting portion has a bent portion or a curved portion extending from the vehicle body attaching portion toward an inside of the vehicle body.

8 Claims, 7 Drawing Sheets

FOREIGN PATENT DOCUMENTS

| | | |
|---|---|---|
| JP | 2000-247203 | 9/2000 |
| JP | 2002-053003 | 2/2002 |
| JP | 2004-210099 | 7/2004 |
| JP | 2004-231147 A | 8/2004 |
| JP | 2005-104234 A | 4/2005 |
| WO | WO 02/28690 A1 | 4/2002 |
| WO | WO 2007/025662 A1 | 3/2007 |

* cited by examiner

CURTAIN AIRBAG BRACKET AND CURTAIN AIRBAG DEVICE

BACKGROUND OF THE INVENTION AND RELATED ART STATEMENT

The present invention relates to a curtain airbag bracket for mounting a curtain airbag to a vehicle body, which develops in the form of a curtain along a side of the vehicle body of an automobile and the like, and also relates to a curtain airbag device including the same.

Hitherto, as one of airbags that are inflated by gas introduced therein in the event of collision of a vehicle such as an automobile and the like, a so-called curtain airbag has been known to develop along the side of the vehicle body. This curtain airbag is accommodated along a corner portion of intersection between a ceiling portion and a side face portion in the interior of the vehicle body in a state of being folded in an elongated shape during a non-deployment state, and is inflated to extend downwardly along the side of the vehicle body by gas introduced therein upon receiving a side impact due to a lateral collision or the like.

Generally, this curtain airbag is mounted to a vehicle body in such a manner that a plurality of attachment pieces (attachment portions) provided in an edge portion of the airbag with a predetermined interval from each other is fixed on an airbag fixing portion provided in the corner portion of intersection in the interior of the vehicle body by using curtain airbag brackets, bolts and the like at a plurality of points in a front-rear direction of the vehicle body. As a curtain airbag bracket like this, for example, there is one described in Patent Document 1: Japanese Unexamined Patent Application Publication No. 2002-053003.

This curtain airbag bracket of a conventional art has an angle-bent configuration having a substantially L-shaped cross section and includes a vehicle body attaching portion (attachment portion), which is attached to the vehicle body using a bolt, and a bottom plate portion (counter-force bearing portion) angle-bent with respect to the vehicle body attaching portion, the bottom plate portion enabling to bear the counter force produced when a curtain airbag develops.

As described above, a curtain airbag is provided with attachment pieces attached to a vehicle body at a plurality of points in the front-rear direction of the vehicle body, and is accommodated along the corner portion of intersection in the vehicle cabin in a state of being folded in an elongated shape in the non-deployment state. At this time, particularly at a part from a front pillar to a roof side rail of the corner portion of intersection in the vehicle cabin, the curtain airbag is accommodated in a state of being curved for structural reasons. As a result, in the case when the curtain airbag is inflated to extend downwardly due to the lateral collision or the like, the attachment portion in the curved part from the front pillar to the roof side rail is subjected to tension (downward tensile force) following the downward expansion of the curtain airbag.

Accordingly, in view of optimizing the curtain airbag, it is required to effectively absorb the downward tension following the expansion of the curtain airbag in the attachment portion at the part from the front pillar to the roof side rail, and to maintain a proper mount state of the curtain airbag.

An object of the present invention is to provide a curtain airbag bracket and a curtain airbag device where a proper mount state of a curtain airbag with respect to a vehicle body can be maintained.

Further objects and advantages of the invention will be apparent from the following description of the invention.

SUMMARY OF THE INVENTION

In order to achieve the above object, according to a first aspect of the invention, a curtain airbag bracket for mounting a curtain airbag to a vehicle body develops along a side of the vehicle body in a form of a curtain, and includes a vehicle body attaching portion for attaching the curtain airbag bracket to the vehicle body and an airbag mounting portion for mounting an attachment piece provided in an edge portion of the curtain airbag. The airbag mounting portion is provided in a state of being angle-bent or being curved toward the interior of the vehicle body with respect to the vehicle body attaching portion.

Generally, a curtain airbag developing along a side of the vehicle body in a form of a curtain is mounted to the vehicle body at a plurality of points in its front-rear direction in such a manner that a plurality of attachment pieces provided in an edge portion of the curtain airbag with a predetermined interval is fixed to an airbag fixing portion provided in the corner portion of intersection between a ceiling portion and a side face portion in the interior of the vehicle body by using bolts or the like through the intermediary of curtain airbag brackets.

In the non-deployment state, the curtain airbag is accommodated along the corner portion of intersection in the vehicle cabin in a state of being folded in the elongated shape. In this occasion, particularly at a part from a front pillar to a roof side rail of the corner portion of intersection in the vehicle cabin, the curtain airbag is accommodated in a state of being curved for structural reasons. Therefore, in the case when the curtain airbag is inflated to extend downwardly due to a lateral collision or the like, the attachment portion in the curved part from the front pillar to the roof side rail is subjected to tension (downward tensile force) following the downward expansion of the curtain airbag.

At this time, in the first aspect of the invention, the attachment piece of the curtain airbag is attached to the airbag mounting portion of the curtain airbag bracket, which is provided so as to protrude toward the interior of the vehicle body in a state of being angle-bent or being curved with respect to the vehicle body attaching portion for attaching the bracket to the vehicle body. Thereby, when the curtain airbag is inflated to extend, the angle-bent portion or the curved portion of the curtain airbag bracket is elastically or plastically deformed in a direction corresponding to tension, and the tension thereby can be effectively absorbed. Therefore, it is possible to maintain a proper mount state of the curtain airbag with respect to the vehicle body by adopting the bracket of the first aspect of the invention to the attachment portion in the curved part from the front pillar to the roof side rail.

In the curtain airbag bracket of a second aspect of the invention according to the first aspect, the airbag mounting portion is perpendicularly provided in a state of being angle-bent toward the interior of the vehicle body substantially with respect to the vehicle body attaching portion.

In the second aspect of the invention, the airbag mounting portion is substantially perpendicularly provided in a state of being angle-bent toward the interior of the vehicle body with respect to the vehicle body attaching portion. Thereby, when the curtain airbag is inflated to extend, tension can be absorbed due to that the substantially angle-bent portion is elastically or plastically deformed in the direction corresponding to the tension. Also, counter force applied to the curtain airbag bracket when the inflation of the curtain airbag is initiated can be received by the airbag mounting portion, which is substantially perpendicularly angle-bent with respect to the vehicle body attaching portion toward the interior of the vehicle body. As a result, the development characteristics of the curtain airbag are improved.

With respect to the curtain airbag bracket according to a third aspect of the invention in the first or second aspect of the invention, the airbag mounting portion includes an inserting through hole for allowing the attachment piece of the curtain airbag to be inserted therethrough.

In the third aspect of the invention, the airbag mounting portion includes an inserting through hole for allowing the attachment piece of the curtain airbag to be inserted therethrough. Thereby, when the attachment piece is attached to the airbag mounting portion of the curtain airbag bracket, the attachment piece can be attached to the airbag mounting portion in such a manner that the attachment piece is folded back in a loop-like shape after being inserted through the inserting through hole, and both of inserted and uninserted portions of the attachment piece are overlapped to be sewn with each other. The configuration where the attachment piece is attached to the curtain airbag bracket in a loop-like form as described above is employed. Accordingly, in comparison with the configuration in which the attachment piece is attached to the curtain airbag bracket by using an attachment member such as a rivet, an attachment bolt or the like, the attachment member becomes unnecessary and the number of parts can be reduced.

In the curtain airbag bracket of a fourth aspect of the invention according to the third aspect of the invention, the inserting through hole is a slit having a length equal to or longer than a width of the attachment piece.

Thereby, when the attachment piece is inserted through the inserting through hole, a wrinkle, a bend, and the like are prevented on the attachment piece. As a result, it is possible to further maintain a proper mount state of the curtain airbag.

In order to achieve the above object, the curtain airbag device of a fifth aspect of the invention includes a curtain airbag developing along a side of a vehicle body in a form of a curtain, a curtain airbag bracket as recited in any one from the first to the fourth aspects of the invention for mounting the curtain airbag to the vehicle body, and an inflator for supplying gas to the curtain airbag.

In the curtain airbag device of the fifth aspect of the invention, the attachment piece of the curtain airbag is mounted to the airbag mounting portion of the curtain airbag bracket, which protrudes toward the interior of the vehicle body in a state of being angle-bent or being curved with respect to the vehicle body attaching portion for attaching the bracket to the vehicle body. Thereby, when the curtain airbag is inflated to extend, the angle-bent portion or the curved portion of the curtain airbag bracket is elastically or plastically deformed in the direction corresponding to tension, and the tension thereby can be effectively absorbed. Therefore, it is possible to maintain a proper mount state of the curtain airbag with respect to the vehicle body by adopting the bracket in any one from the first to the fourth aspects of the invention to the attachment portion in the curved part from the front pillar to the roof side rail.

According to the present invention, a proper mount state of the curtain airbag with respect to the vehicle body can be maintained.

DETAILED DESCRIPTION OF PREFERRED EMBODIMENTS

Embodiment of the present invention will be described below with reference to the drawings.

Figure 1:
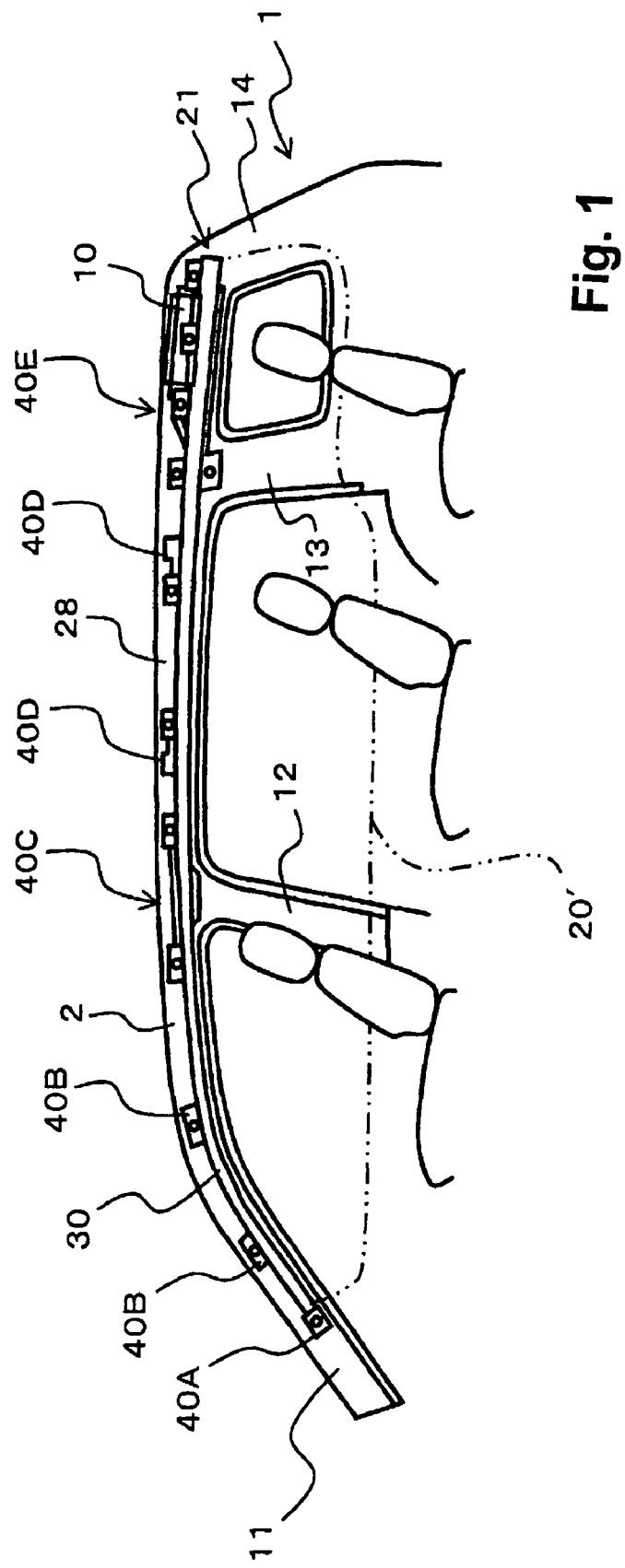
FIG. 1 is an explanatory drawing schematically illustrating a state of mounting a curtain airbag device according to an embodiment of the present invention to an automobile.
Figure 2:
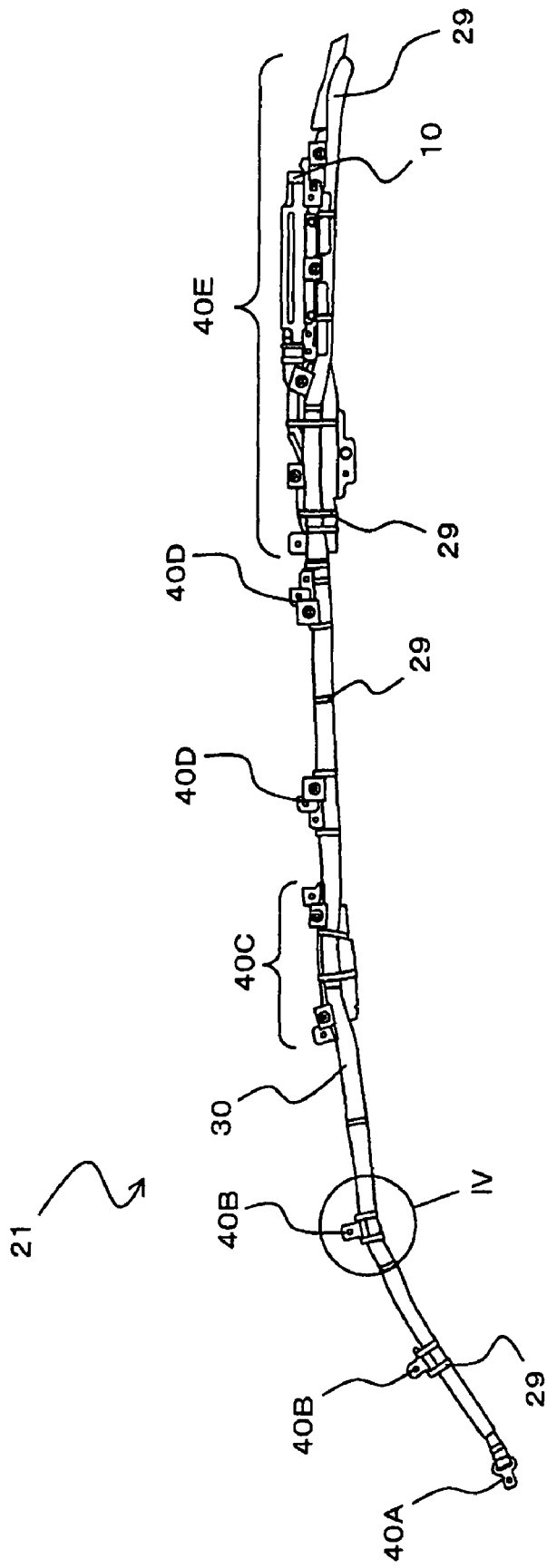
FIG. 2 is an external side view of the whole of the curtain airbag device.

FIG. 1 is an explanatory drawing schematically illustrating a state of mounting a curtain airbag device to an automobile according to an embodiment of the present invention. And, FIG. 2 is an external side view of the whole of the curtain airbag device. It is noted that, in the following, a curtain airbag device and a portion thereof mounted to a vehicle body on its driver seat side (right side toward the front of a vehicle body) are described by illustrating in the drawings for convenience of explanation, unless described otherwise, the explanation is provided so that the left side in the drawings is the front side of a vehicle body, the right side in the drawings is the rear side, and the up-and-down direction in the drawings is the up-and-down direction of the vehicle body. In addition, FIG. 3 is a partially cutaway perspective view illustrating a state of accommodating a curtain airbag, and particularly in this drawing, the direction toward the viewer from the lower left side in the drawing corresponds to the front side of the vehicle body.

Figure 3:
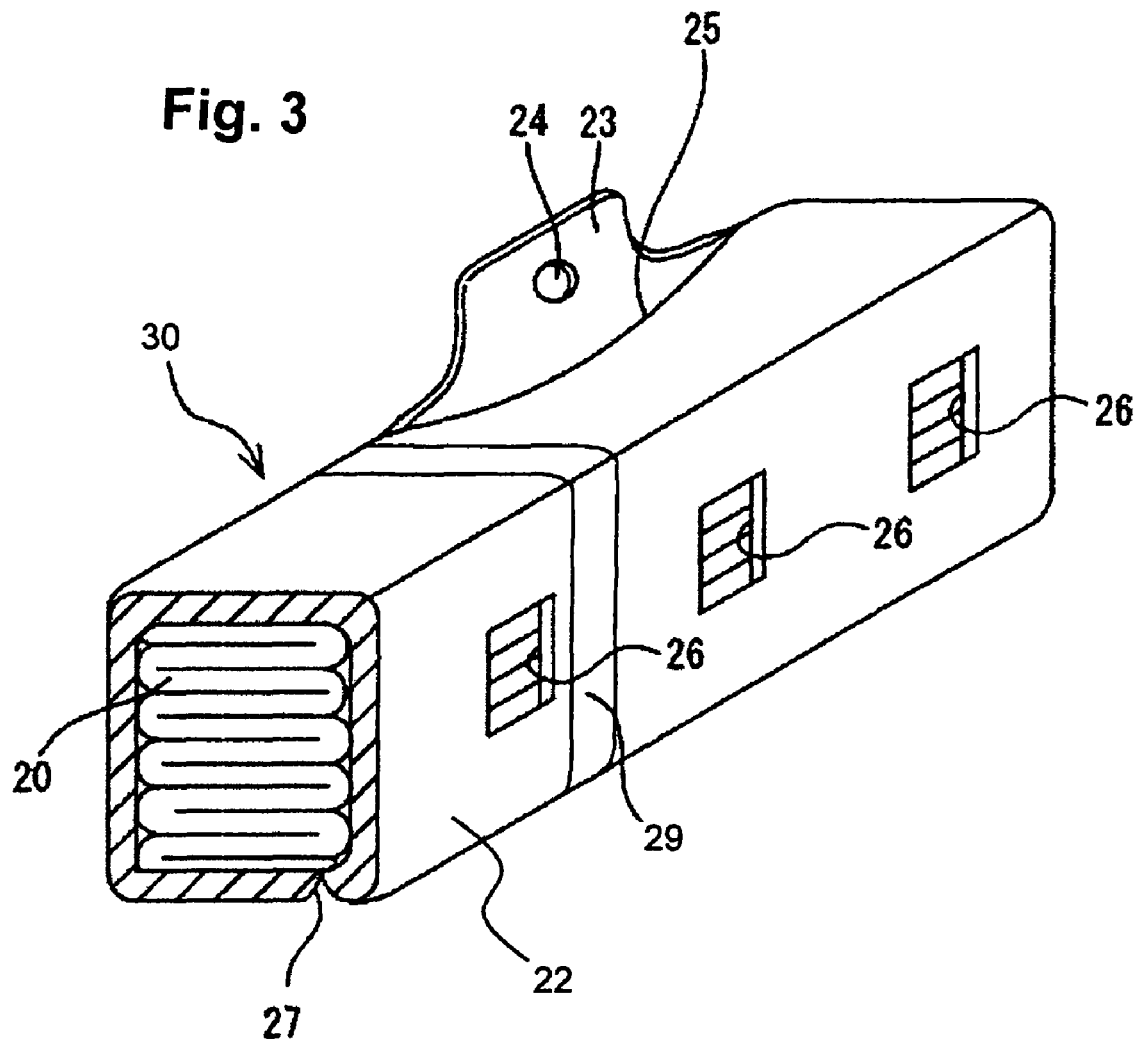
FIG. 3 is a partially cutaway perspective view illustrating a state of accommodating a curtain airbag.

In these FIGS. 1, 2 and 3, there are provided three rows of aligned seats in a front-rear direction in the interior of the vehicle body 1 of an automobile, and a curtain airbag device 21 is provided in the corner portion of intersection between a ceiling portion and a side face portion in the interior of the vehicle body 1.

The curtain airbag device 21 includes an airbag holding body 30, which is configured to hold the whole of a folded curtain airbag 20 by covering with a breakable cover member 22, an inflator 10, which is mounted in the rear side of the curtain airbag device 21 and supplies a pressurized gas (pressurized fluid) to the curtain airbag 20, a plurality of brackets 40A, 40B, 40C, 40D for mounting the airbag holding body 30 to the vehicle body 1, and a construction body bracket 40E for mounting the airbag holding body 30 and the inflator 10 to the vehicle body 1 in a state of being connected to each other. And, in the event of a lateral collision, rollover or the like of an automobile, a sensor (not shown) for detecting a collision to send an initiation signal to the inflator 10 detects the collision, the initiation signal is input from an inflator control circuit (not shown) to an initiator (not shown) of the inflator 10 to cause the initiator to initiate, the inflator 10 is activated to blow out pressurized gas for inflating an airbag, and the curtain airbag 20 is inflated to extend downwardly as indicated with a two-dot chain line 20' in FIG. 1, by which the head portion of an occupant is restrained.

In the airbag holding body 30, as illustrated in FIG. 3, the curtain airbag 20 is held by the cover member 22 in a state of being folded by being overlaid with each other in a fanfold manner in an up-and-down direction so as to form a rectangular cross sectional shape. At this time, ear-shaped attachment pieces 23, which are provided to an upper edge portion of the curtain airbag 20 so as to project therefrom, project upwardly through narrow openings (slots) 25 provided in a top-face portion of the cover member 22 on its vehicle body side. It is noted that the attachment pieces 23 may be one formed in one piece with the curtain airbag 20, or one formed as a separate member to be joined to the edge portion of the curtain airbag 20 by being sewn (also the same for attachment pieces 23A, 23B described later).

The attachment pieces 23 are provided in a plural number in the upper end portion of the curtain airbag 20 along its longitudinal direction, each of the attachment pieces 23 being provided with an inserting through hole 24 for an attachment member (for example, a rivet, an attachment bolt or the like). Furthermore, in a side face portion of the cover member 22 on the vehicle cabin side, a plurality of up-and-down directional openings 26 are provided in its longitudinal direction. Also, it enables to visually observe the folded state of the curtain airbag 20 through the openings 26 from the outside of the cover member 22.

In a corner portion of the cover member 22 on the vehicle cabin side, in which the side face portion on the vehicle cabin side and the top-face portion of the cover member 22 intersect with each other, a breakage portion 27 is provided so as to serve as a breakage point of the cover member 22 when the airbag 20 is inflated. The outer periphery of the cover member 22 is held by being wound with a plurality of breakable bands 29 with a predetermined interval. And like this, the whole of the cover member 22 and the curtain airbag 20 held inside thereof constitutes the airbag holding body 30.

The airbag holding body 30 has a substantially bow shape along a longitudinal direction, and is fixed to an airbag fixing portion 28 through the intermediary of the brackets 40A, 40B, 40C, 40D and the construction body bracket 40E, the airbag fixing portion 28 being provided in the corner portion of intersection between the ceiling portion and the side face portion, specifically along a roof side rail 2 from an A-pillar 11 (front pillar) in the interior of the vehicle body 1.

The bracket 40A is attached to the attachment piece 23 positioned at the tip of the airbag holding body 30 on the front side of the vehicle body, and is fixed to the inside of the A-pillar 11. In this bracket 40A, although the detailed construction is not particularly illustrated in the drawings, there is formed a folding-back hole for inserting through and folding back an attachment piece 23A (not shown, being formed to be longer than the attachment piece 23 illustrated in FIG. 3) provided in the tip portion of the curtain airbag 20 in the airbag holding body 30 on the front side of the vehicle body. The attachment piece 23A inserted through the folding-back hole is folded back and its overlapped portion is fastened by sewing or by a fastening member (for example, a rivet or the like, the same for the following). Accordingly, it is so configured that the tip of the curtain airbag 20 is attached to the bracket 40A.

The bracket 40B (curtain airbag bracket) is provided at two places particularly in the curved part from the A-pillar 11 to the roof side rail 2 of the corner portion of intersection. In the bracket 40B, although the details are described later, there is formed a slit 48 (refer to FIG. 5 and FIG. 6 described later) for inserting through and folding back an attachment piece 23B (refer to FIG. 4 to FIG. 6 described later, being formed to be longer than the attachment piece 23 illustrated in FIG. 3) of the curtain airbag 20 in the airbag holding body 30 as with the above bracket 40A, and the attachment piece 23B inserted through the slit 48 is folded back and its overlapped portion is fastened by sewing or by a fastening member. Therefore, it is so configured that the curtain airbag 20 is mounted to the bracket 40B.

The bracket 40C is provided, in this example, on a B-pillar 12 of the airbag fixing portion 28, the B-pillar 12 being positioned at a second distance position from the front of the vehicle body 1. This bracket 40C is, although the detailed construction is not particularly illustrated in the drawings, a bracket having two pieces of airbag mounting portions for mounting the attachment piece 23.

The brackets 40D, 40D are provided, in this example, at two places on the airbag fixing portion 28, the two places being located between the B-pillar 12 positioned at the second distance position from the front of the vehicle body 1 and a C-pillar 13 positioned at a third distance position from the front of the vehicle body 1. Although the detailed construction is not particularly shown in the drawings, this bracket 40D includes a plural number (two in this example) of the airbag mounting portions for mounting the attachment piece 23 of the curtain airbag 20 in the airbag holding body 30, and is configured so that the attachment piece 23 can be selectively attached to a plural number of the airbag mounting portions.

The bracket 40E is provided, in this example, on the airbag fixing portion 28, between the C-pillar 13 positioned at a third distance position from the front of the vehicle body 1 and a D-pillar 14 (rear pillar) positioned in the rear of the vehicle body 1. Although the detailed construction is not particularly shown in the drawings, this bracket 40E includes a plural number (four in this example) of the airbag mounting portions for mounting the attachment piece 23 of the curtain airbag 20 in the airbag holding body 30, and is configured so as to hold the inflator 10 in parallel with and in proximity to the airbag holding body 30.

Figure 4:
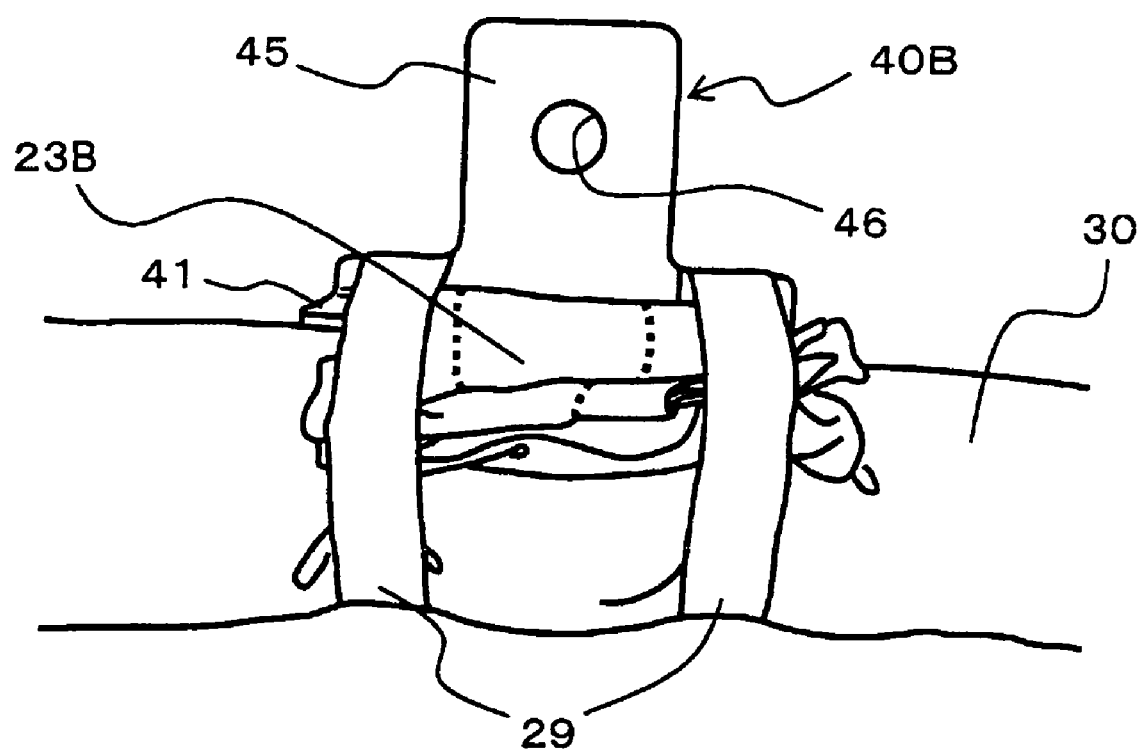
FIG. 4 is a magnified view of a portion 4 in FIG. 2.
Figure 5:
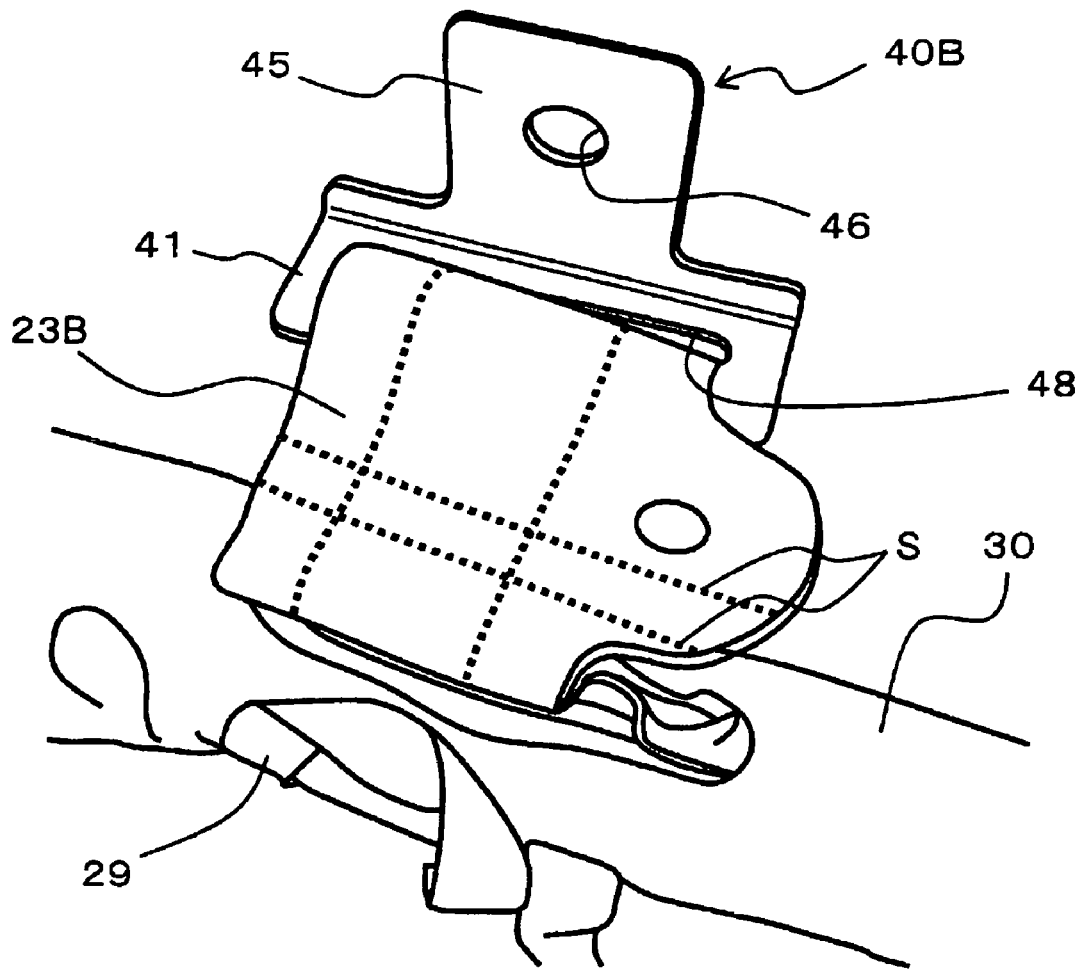
FIG. 5 is a view illustrating a state in which a band in the portion 4 is broken and an attachment piece is developed.
Figure 6A:
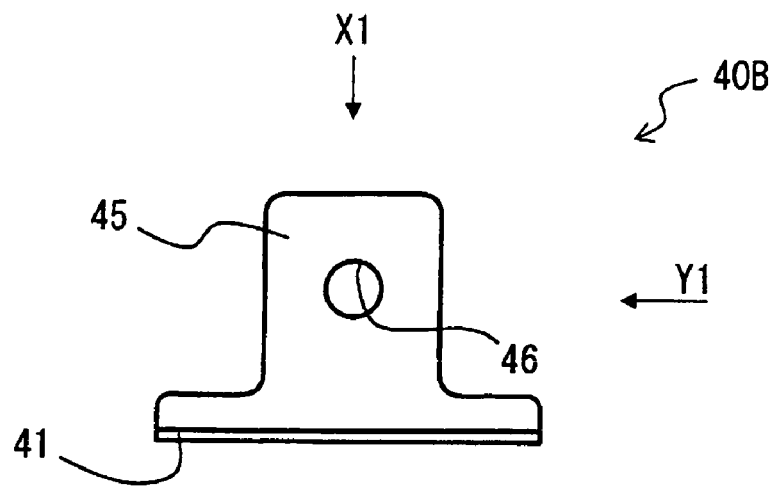
FIGS. 6(a), 6(b) and 6(c) are a front view, a top plan view and a side view, respectively, illustrating a detailed construction of a bracket.
Figure 6B:
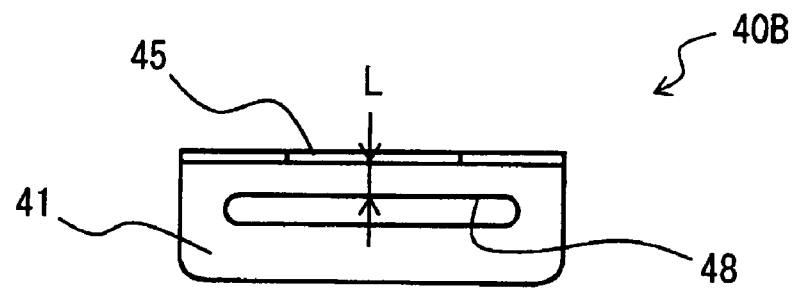
Figure 6C:
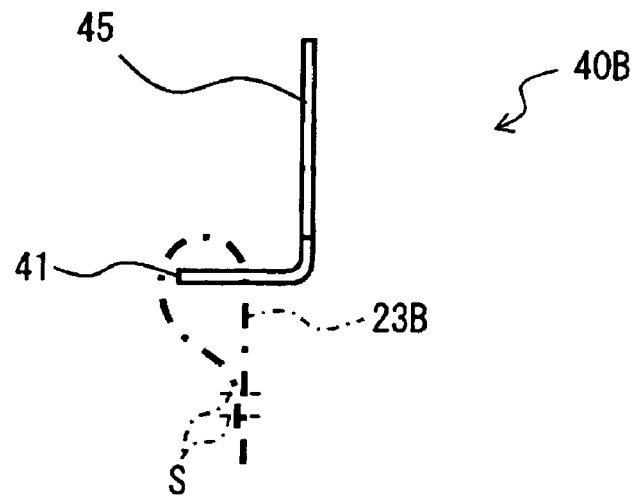

FIG. 4 is a magnified view of a portion 4 including the bracket 40B in FIG. 2, and FIG. 5 is a view illustrating a state in which the band 29 in this portion 4 is broken and the attachment piece 23B is developed. In addition, FIG. 6(a) is a front view illustrating a detailed construction of the bracket 40B, FIG. 6(b) is a top plan view of the bracket 40B seen from the direction X1 in FIG. 6(a), and FIG. 6(c) is a side view of the bracket 40B seen from the direction Y1 in FIG. 6(a). Incidentally, in FIG. 6(c), the attachment piece 23B of the curtain airbag 20 is indicated with an imaginary line.

As illustrated in FIGS. 4, 5 and 6(a), 6(b), (6(c), the bracket 40B includes a vehicle body attaching portion 45 for attaching the bracket 40B to the vehicle body 1 and an airbag mounting portion 41 for mounting the attachment piece 23B provided in the edge portion of the curtain airbag 20, the airbag mounting portion 41 being substantially perpendicularly provided in a state of being bent with respect to the vehicle body attaching portion 45 toward the interior of the vehicle body (the side toward the viewer in FIG. 6(a), the lower side in FIG. 6(b), the left side in FIG. 6(c)). Thereby, the bracket 40B has a substantially "L" shape when seen from the side as illustrated in FIG. 6(c).

The vehicle body attaching portion 45 is formed such that a portion thereof on the lower side has the same width dimension as the length of the airbag mounting portion 41 in its longitudinal direction and the other portion thereabove has a width dimension smaller than the length of the airbag mounting portion 41 in its longitudinal direction. In the vehicle body attaching portion 45, there is provided an inserting through hole 46 for inserting through an attachment member (for example, a rivet, an attachment bolt or the like) for fixing the bracket 40B to the vehicle body 1 so that the center of the hole is positioned on the center line of the whole of the vehicle body attaching portion 45. The bracket 40B is fixed to the vehicle body 1 by inserting through the attachment member into the inserting through hole 46 of the vehicle body attaching portion 45 and by fitting in a fit hole (not shown) provided in the airbag fixing portion 28 on the vehicle body side (by fastening in a threaded hole in the case of an attachment bolt).

On the other hand, the airbag mounting portion 41 includes the slit 48 (inserting through hole) for inserting through the attachment piece 23B of the curtain airbag 20. This slit 48 is formed to be shorter than the overall length of the airbag mounting portion 41 in its longitudinal direction and to have a length equal to or longer than the width of the attachment piece 23B so as to allow the attachment piece 23B to be inserted therethrough by being arranged in parallel with the longitudinal direction of the airbag mounting portion 41.

In the bracket 40B configured like this, as illustrated in FIG. 5 and FIG. 6(c), when the attachment piece 23B of the curtain airbag 20 is attached to the airbag mounting portion 41 of the bracket 40B, the attachment piece 23B is folded back in a loop-like shape after being inserted through the slit 48, and both of inserted and uninserted portions of the attachment piece 23B are overlapped to be sewn with each other (the sewn line is indicated with a mark S in FIG. 5 and FIG. 6(c)). Thereby, the attachment piece 23B of the curtain airbag 20 is attached to the airbag mounting portion 41 of the bracket 40B. Then, the bracket 40B is mounted to the airbag holding body 30 while keeping contact therewith by folding the remaining portion of the attachment piece 23B and fixing it by winding the band 29 therearound (refer to FIG. 4).

Advantages obtained by the curtain airbag bracket 40B of this embodiment configured as described above will be described below.

Figure 7A:
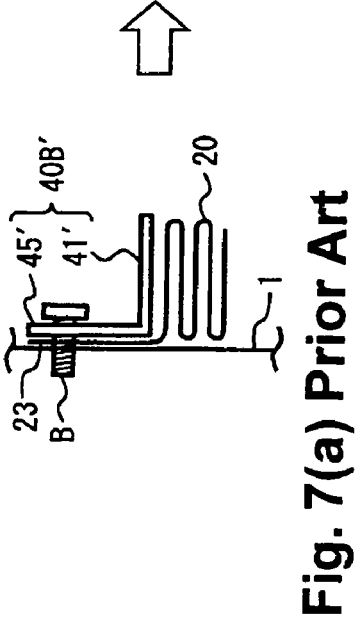
FIG. 7(a) is a view showing a development of a conventional curtain airbag.
Figure 7B:
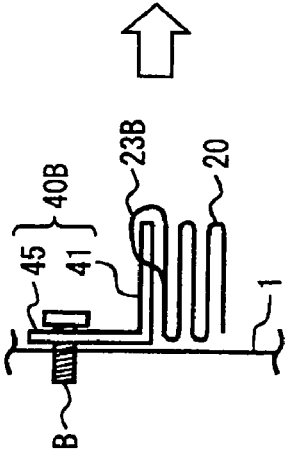
FIG. 7(b) is a view showing a development of an embodiment of the present invention.

FIGS. 7(a), 7(b) are views for explaining advantages of this embodiment. In FIG. 7(a), the behavior of a curtain airbag bracket 40B' when an airbag is inflated and extends is conceptually illustrated, and the curtain airbag bracket 40B' is a comparable example. In FIG. 7(b), the behavior of the curtain airbag bracket 40B of this embodiment when an airbag is inflated and extends is conceptually illustrated.

In the comparable example illustrated in FIG. 7(a), the bracket 40B' includes a vehicle body attaching portion 45' attached to a vehicle body 1' by a bolt B, and a bottom plate portion 41' substantially perpendicularly provided in a state of being bent with respect to the vehicle body attaching portion 45' toward the interior of the vehicle body (the right side in FIG. 7(a)). In this comparable example, the curtain airbag 20 is mounted to the vehicle body 1' in such a manner that an attachment piece 23 of the curtain airbag 20 is sandwiched between the vehicle body attaching portion 45' and the vehicle body 1' and is fastened together therewith.

In the bracket 40B' of this comparable example, as illustrated in the middle view of FIG. 7(a), the counter force F1, applied to the bracket 40B' when the inflation of the curtain airbag 20 is initiated, is received by the bottom plate portion 41' substantially perpendicularly bent with respect to the vehicle body attaching portion 45'.

However, in the case when the bracket 40B' is adopted to the same place as the bracket 40B of this embodiment, problems arise as described below. That is, in a part from a front pillar to a roof side rail of the corner portion of intersection of the vehicle body 1, the curtain airbag 20 is accommodated in a state of being curved for structural reasons. Accordingly, in the case when the curtain airbag 20 is inflated to extend downwardly due to a lateral collision or the like, the attachment portion in the curved part from the A-pillar 11 to the roof side rail 2 is subjected to tension F2 (downward tensile force) following the downward expansion of the curtain airbag 20.

Therefore, in the case where the bracket 40B' of the comparable example is adopted to the same place as the bracket 40B of this embodiment, when the tension F2 described above acts relatively heavily, it is possible that the attachment piece 23 of the curtain airbag 20 is broken away from the airbag body portion as illustrated in the right view in FIG. 7(a). As the result, it is not possible to maintain a proper mount state of the curtain airbag 20 with respect to the vehicle body 1 by using the bracket 40B' of this comparable example.

On the contrary, the bracket 40B of this embodiment includes, as described above, a vehicle body attaching portion 45 and an airbag mounting portion 41, which is substantially perpendicularly provided in a state of being angle-bent with respect to the vehicle body attaching portion 45 toward the interior of the vehicle body (the right side in FIG. 7(b)) and in which an attachment piece 23B of the curtain airbag 20 is mounted by inserting through a slit 48. Due to the configuration like this, as illustrated in the middle view of FIG. 7(b), when the inflation of the curtain airbag 20 is initiated, the counter force F1 applied to the bracket 40B is received by the airbag mounting portion 41 substantially perpendicularly angle-bent with respect to the vehicle body attaching portion 45, as with the comparable example described above. Moreover, as illustrated in the right view in FIG. 7(b), even when the tension F2 following the downward expansion of the curtain airbag 20 acts relatively heavily, the angle-bent portion of the bracket 40B is elastically or plastically deformed in the direction corresponding to the tension F2, thereby effectively absorbing the tension. As the result, it is possible to maintain a proper mount state of the curtain airbag 20 with respect to the vehicle body 1.

In addition, the bracket 40B of this embodiment includes a slit 48 used for the airbag mounting portion 41 to allow the attachment piece 23B of the curtain airbag 20 to be inserted therethrough. And, when the attachment piece 23B is attached to the airbag mounting portion 41 of the bracket 40B, as described above, the attachment piece 23B is attached to the airbag mounting portion 41 in such a manner that the attachment piece 23B is folded back in a loop-like shape after being inserted through the slit 48, and both inserted and uninserted portions of the attachment piece 23B are overlapped to be sewn with each other. It is so configured that the attachment piece 23B is attached to the bracket 40B in a loop-like form as described above. Therefore, in comparison with the configuration in which the attachment piece 23B is attached to the bracket 40B by using an attachment member such as a rivet, an attachment bolt or the like, an attachment member becomes unnecessary and the number of parts can be reduced.

Furthermore, particularly in this embodiment, the slit 48 formed in the airbag mounting portion 41 of the bracket 40B has a length equal to or more than the width of the attachment piece 23B. Thereby, when the attachment piece 23B is inserted through the slit 48, a wrinkle, a bend, and the like are prevented on the attachment piece 23B. As the result, it is possible to further maintain a proper mount state of the curtain airbag 20.

It should be noted that, although the embodiment described above is an example of preferable embodiments of the present invention, the invention is not limited to the embodiment and may be practiced in various other forms not departing from the spirit and scope of the invention.

For example, in the above, the airbag mounting portion 41 is configured to be substantially perpendicularly angle-bent with respect to the vehicle body attaching portion 45 toward the interior of the vehicle body 1. However, the bending angle is not necessarily perpendicular and it may be bent toward the interior of the vehicle body 1 so that the angle between the airbag mounting portion 41 and the vehicle body attaching portion 45 becomes an acute angle or an obtuse angle. Alternatively, a construction in which the airbag mounting portion 41 is not angle-bent but is gradually curved may be employed.

Additionally, in the above, the attachment piece 23B is fastened by being sewn after folded back, but from the viewpoint of obtaining the advantage that "a proper mount state of a curtain airbag 20 can be maintained", it is not necessary to fasten the attachment piece 23B after folded back by sewing, but may be fastened by an attachment member (for example, a rivet or the like).

The disclosure of Japanese Patent Application No. 2008-150874 filed on Jun. 9, 2008 is incorporated as a reference.

While the invention has been explained with reference to the specific embodiments of the invention, the explanation is illustrative and the invention is limited only by the claims.

What is claimed is:

1. A curtain airbag device, comprising:
   a curtain airbag developing along a side of a vehicle body in a form of a curtain, and having an attachment piece to the vehicle body, and
   a curtain airbag bracket for mounting the curtain airbag to the vehicle body, said curtain airbag bracket comprising:
   a vehicle body attaching portion for attaching the curtain airbag bracket to the vehicle body, said vehicle body attaching portion having a hole therein, and
   an airbag mounting portion for mounting and attaching the attachment piece of the curtain airbag, said airbag mounting portion integrally formed with the vehicle body attaching portion and having a bent portion extending from the vehicle body attaching portion toward an inside of the vehicle body, a slit in the bent portion extending toward an inside of the vehicle body, the slit being spaced from a bend line between the vehicle body attaching portion and the airbag mounting portion so that the attachment piece of the curtain airbag passes therethough and is secured to itself below the airbag mounting portion such that when a predetermined force is applied to the airbag mounting portion due to expansion of the curtain airbag, the airbag mounting portion bends in a direction in which the predetermined force acts.

2. The curtain airbag device according to claim 1, wherein said bent portion extends substantially perpendicularly from the vehicle body attaching portion.

3. The curtain airbag device according to claim 1, wherein the slit has a length equal to or longer than a width of the attachment piece.

4. The curtain airbag device according to claim 1, further comprising:
   an inflator for supplying gas to the curtain airbag.

5. The curtain airbag device according to claim 4, wherein the airbag mounting portion is positioned above the curtain airbag so that the airbag mounting portion bends upwardly and at least in part absorbs a predetermined force when the predetermined force comprises an upward force from the curtain airbag when the curtain airbag is inflated upwardly, and bends downwardly and at least in part absorbs the predetermined force when the predetermined force comprises a downward force when the curtain airbag is inflated downwardly.

6. The curtain airbag device according to claim 5, wherein the airbag mounting portion is elastically or plastically deformed upon receiving the downward force from the curtain airbag.

7. The curtain airbag bracket according to claim 1, wherein the attachment piece, loops over an edge of the airbag mounting portion so as to be connected to itself below the airbag mounting portion.

8. The curtain airbag bracket according to claim 1, wherein the attachment piece, surrounds a portion of the airbag mounting portion between the slit and an edge of the airbag mounting portion so as to be connected to itself below the airbag mounting portion.

* * * * *